April 19, 1938. M. TIBBETTS 2,114,788
MOTOR VEHICLE
Filed June 4, 1934 2 Sheets-Sheet 1
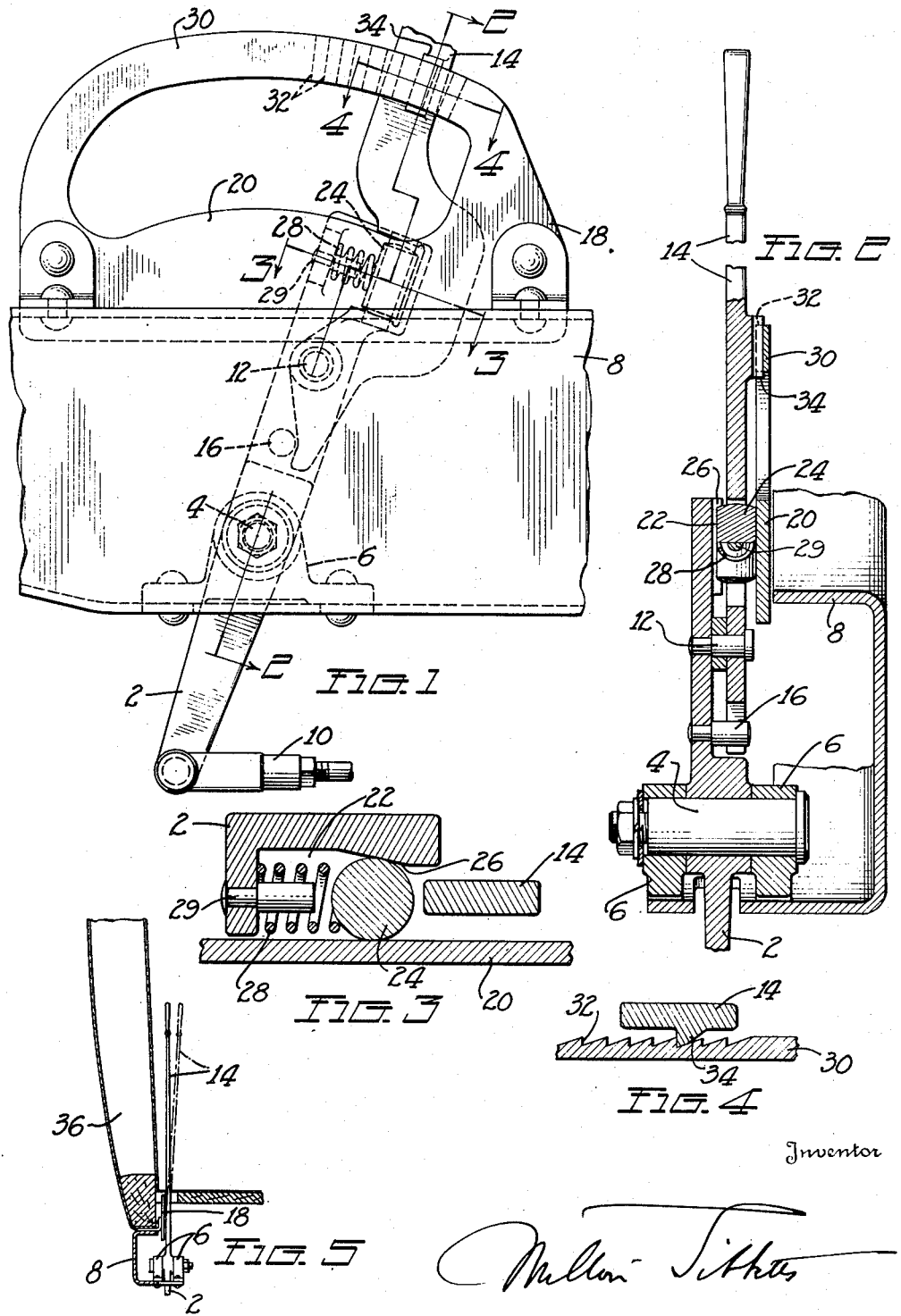

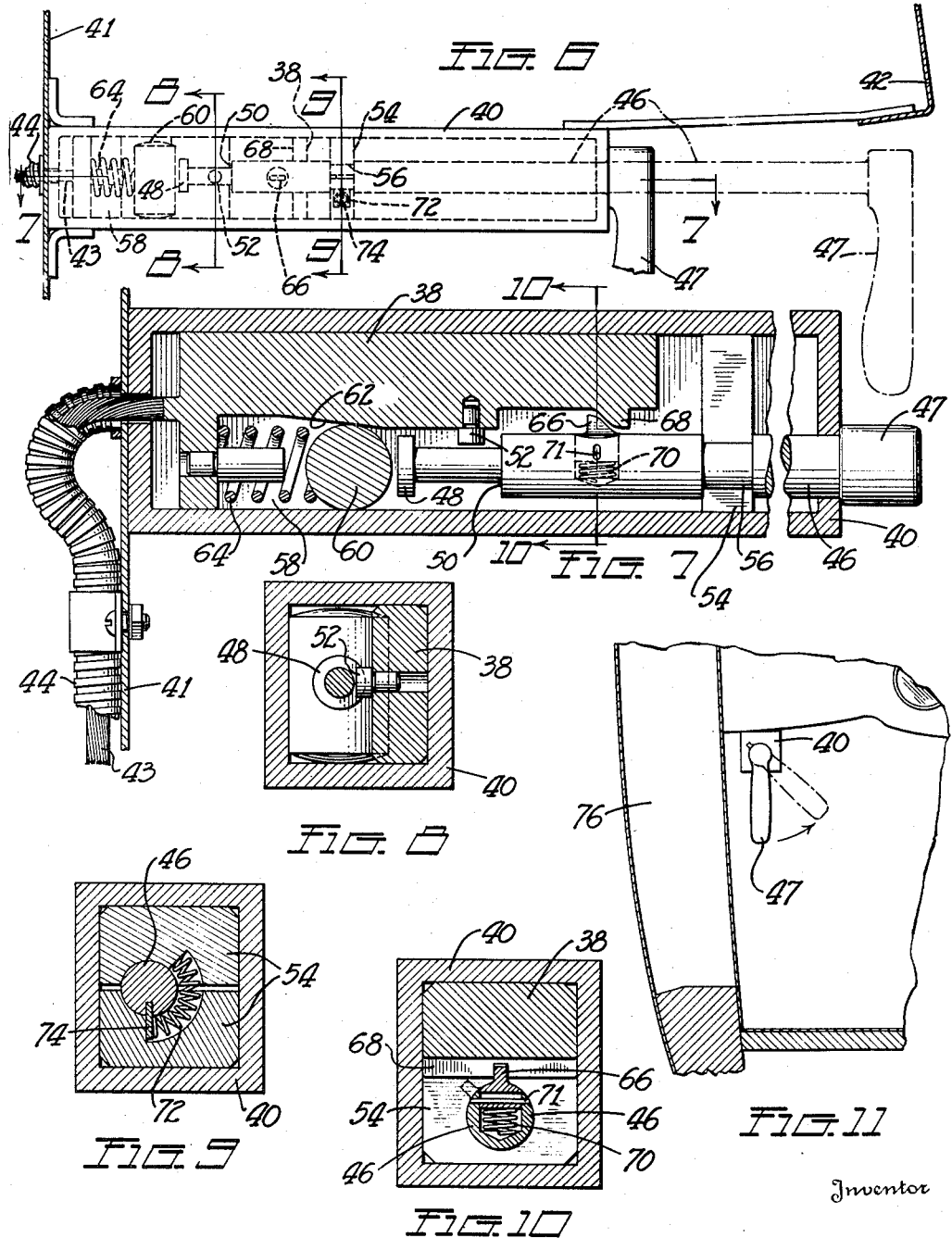

Patented Apr. 19, 1938

2,114,788

UNITED STATES PATENT OFFICE 2,114,788

MOTOR VEHICLE

Milton Tibbetts, Detroit, Mich., assignor to Packard Motor Car Company, Detroit, Mich., a corporation of Michigan Application June 4, 1934, Serial No. 728,836

23 Claims. (Cl. 74—531)

This invention relates to motor vehicles and more particularly to brake mechanisms for such vehicles.

In the usual emergency or hand operated brake mechanism for motor vehicles, the hand lever is locked in brake applying position by means of a pawl or dog carried by the lever and arranged to engage the teeth of a stationary segmental ratchet bar. When the emergency brake is engaged the entire reaction of the brake pressure is applied to the hand lever and the dog is thus forced against one of the teeth of the ratchet with a force corresponding to the force with which the brake is engaged. The friction thus produced between the dog and the ratchet tooth makes it often very difficult to release the lever from brake engaging position. In disengaging the brake it is necessary first to pull on the hand lever to relieve the reaction of the brake on the lever and then to operate the dog release mechanism to throw out the dog. It sometimes occurs that the brake is engaged with such force that a person who wishes to start the vehicle will not be able to release the lever to disengage the brake without assistance.

Brake mechanisms of this type have been produced in which the hand lever is locked in position by a roller clutch or locking device. In such constructions the brake is applied as usual by the movement of the hand lever in one direction, the roller acting automatically to lock the brake in engaged position. The roller is thrown out of locked position to release the brake by movement of the hand lever in the reverse direction. This mechanism enables the locking devices to be easily released but has the disadvantage that the hand lever may easily be actuated accidentally to throw out the brake locking devices. Thus the hand lever may be actuated to release the brake by the engagement of the foot or some other part of the body of a person with the lever when said person is entering or leaving the vehicle or moving about in the vehicle. Also, the lever may be actuated to release the brake by a child.

One object of the present invention is to improve the construction and mode of operation of locking devices for locking an emergency brake in braking position and to produce a locking mechanism for such brakes which will lock the brake securely in braking position, which may be easily unlocked by the exertion of a relatively light force but which is not liable to be actuated accidentally to unlock the brake.

Another object of the invention is to provide motor vehicles with a locking mechanism for a manually operable brake actuating member which may be easily operated to unlock said member regardless of the force applied to engage the brake and which is securely held against unlocking movement by readily releasable mechanism.

Another object of the invention is to produce an emergency brake mechanism having a locking mechanism for locking the brake in braking position and a manually operable member for unlocking the brake and for applying the same respectively in which said member is normally held securely against unlocking movement and may at all times be readily operated to release the brake.

With the above and other objects in view, the invention consists in a construction embodying the novel and improved features hereinafter described and particularly pointed out in the claims, the advantages of which will be readily understood by those skilled in the art.

The invention will be clearly understood from the accompanying drawings illustrating the invention in its preferred form and the following detailed description of the constructions therein shown.

In the drawings, Fig. 1 is a view in side elevation illustrating a hand operated brake mechanism embodying the invention;

Fig. 2 is a sectional view of said mechanism taken substantially on the line 2—2 of Fig. 1;

Fig. 3 is a detail sectional view taken substantially on the line 3—3 of Fig. 1;

Fig. 4 is a detail sectional view taken substantially on the line 4—4 of Fig. 1;

Fig. 5 is a view in vertical section taken through one side of a motor vehicle, looking forwardly and showing a brake mechanism such as that illustrated in Fig. 1 as applied to the vehicle;

Fig. 6 is a view in side elevation illustrating another form of brake mechanism embodying the invention;

Fig. 7 is a sectional view of said mechanism taken substantially on the line 7—7 of Fig. 6;

Fig. 8 is a sectional view taken substantially on the line 8—8 of Fig. 6;

Fig. 9 is a sectional view taken substantially on the line 9—9 of Fig. 6;

Fig. 10 is a sectional view taken substantially on the line 10—10 of Fig. 7, and Fig. 11 is a view in vertical section taken through one side of a motor vehicle body looking forwardly and showing a brake mechanism such as that illustrated in Fig. 6 as applied to the vehicle.

In the form of the invention illustrated in Figs. 1 to 5 inclusive, the brake mechanism comprises a member 2 which is movable in opposite directions to apply and release the brake. This member 2 consists of a lever pivoted at 4 between spaced brackets 6 attached to the lower flange on one of the longitudinal side frame members 8 of the vehicle. To the lower end of the lever 2 is pivoted a brake rod 10 connected with the brake or brakes. The connections between the rod 10 and the brake are such that the longitudinal movement of the rod to the left, Fig. 1, will engage the brake and that the longitudinal movement of the rod to the right will release the brake.

To the lever 2 is pivoted at 12 a hand lever 14. The lower end of the lever 12 is arranged to engage a stop pin 16 secured in the lever 2 which limits the movement of the hand lever with relation to the lever 2 in one direction.

In applying the brake the handle at the upper end of the hand lever 14 is grasped by the driver and the lever is swung to the right, Fig. 1. During this movement the lower end of the hand lever engages the pin 16 and the lever 2 is thereby swung about its pivot 4 with the hand lever to apply the brake.

A readily releasable locking mechanism is provided for locking the lever 2 in brake engaging position. To this end a plate 18 is secured to the upper flange of the longitudinal side frame member 8 and is provided with a segment 20 located alongside the upper portion of the lever 2. The upper portion of the said lever preferably has the form in cross section shown in Fig. 3, providing a recess 22 within which is mounted a roller 24 arranged to be engaged between the segment 20 and an inclined face 26 formed on the lever 2 to lock said lever to the segment. The roller is acted upon by a coiled spring 28 surrounding a pin 29 secured in the lever, which spring tends to force the roller into locking position. The roller is disengaged from locking position by the hand lever 14, a part of which is arranged to move between the lever 2 and the segment 20 so as to engage the roller as clearly shown in Fig. 3.

With the above construction, when the hand lever is swung to the right, Fig. 1, to apply the brake and is then released, the lever 2 is locked in brake engaging position by the roller 24. To release the brake, the hand lever is swung to the left, Fig. 1. During the first part of this latter movement, the lever 2 then being locked in position, the hand lever is swung about the pivot 12 into contact with the roller 24 and the roller is thereby released from locking engagement between the lever 2 and the segment 20. After the release of the locking mechanism the movement of a hand lever is preferably continued until the lever 2 is moved into its limiting brake release position. During this movement of the hand lever the lever 2 may be moved from the hand lever through the engagement of the hand lever with the roller 24 and the engagement of the roller with the spring 28, the lever 2 being yieldingly actuated through the spring. If the resistance to this movement of the lever 2 is sufficient the roller 24 may be engaged with the pin 29 and the lever 2 then actuated positively from the hand lever.

The lever 2 thus may be very easily unlocked with the exercise of a relatively light force regardless of the force with which the brake is engaged. In order to prevent the accidental actuation of the hand lever to throw out the locking mechanism, means is provided for holding the lever 14 from being swung to the left sufficiently to release the brake after the brake mechanism has been locked. This holding means is readily releasable to enable the lever 14 to be moved into unlocking position.

The mechanism for holding the lever 14 from unlocking movement comprises a segment 30 formed on the plate 18 and provided with a series of ratchet teeth 32 arranged to be engaged by a tooth 34 carried by and preferably formed integral with the lever 14. The parts are constructed and arranged so that lever 14 is normally held in position to engage the tooth 34 with one of the teeth 32 as shown in Fig. 4 by the spring of the metal in the said lever. The lever 14, however, may be laterally flexed as shown in Fig. 5 to disengage the tooth 34 from the said tooth 32 and thereby release said lever.

With the construction just described, when the lever 14 has been actuated to engage the brake and the lever 2 has been locked in brake engaging position, the lever 14 will be held from unlocking movement by the engagement of the tooth 34 with one of the teeth 32. The lever 14, however, may be readily released so that it may be moved to unlock the lever 2 by bending the lever 14 laterally away from the segment 30 as illustrated in Fig. 5. Thus the lever 14 is held securely from accidental unlocking movement. The length of the hand lever 14 gives the driver a high leverage for the movement of said lever into the released position.

Fig. 5 shows the location in which the levers 14 and 2 are preferably placed with relation to the side wall of a vehicle to prevent the lever 14 from being accidentally released from its holding means. As shown in this figure, the lever 14 is mounted relatively close to the side wall of the vehicle indicated as a whole at 36 so that it is impossible for the driver or any other person within the vehicle to insert his foot or leg between the lever and the side of the vehicle.

In the construction shown in Figs. 6 to 11 inclusive, the locking mechanism for the brake comprises a member 38 movable in one direction to apply the brake, and in the other direction to release the brake. This member is mounted for sliding movement longitudinally within a casing 40 secured to the dash 41 and to the instrument board 42. The said member is arranged to apply the brake by means of a wire or cable 43 connected at one end with the member 38 and at the other end with the brake mechanism. This cable is arranged within a tube 44, the cable and tube having substantially the mode of operation of the well known Bowden wire mechanism.

The member or slide 38 is moved to the right, Figs. 6 and 7, to apply the brake by means of a rod 46 mounted for longitudinal movement in the casing 40 and provided with a collar 48 and with a shoulder 50 arranged to engage a pin 52 carried by the slide 38 to actuate the slide. This rod is provided with an arm 47 at the forward end thereof adapted to be grasped by the driver in manipulating the rod. The rod has a bearing at its outer end in the end wall of the casing 40 and adjacent its inner end is supported by bearing blocks 54 engaging in a groove 56 in the rod, said bearing blocks being arranged to slide longitudinally of the casing 40.

In order to lock the slide 38 in brake engaging position, the slide has the form in cross section, illustrated in Fig. 7, providing a recess 58 in which is mounted a locking roller 60 arranged to engage the adjacent side wall of the casing 40 and an inclined face 62 formed on the slide 38 to lock the slide to the casing. The roller is acted upon by a coiled spring 64 which tends to maintain the roller in locking position.

In applying the brake, the arm 47 is grasped by the driver and the rod 46 is moved longitudinally to the right, Figs. 6 and 7, and is then released. During this movement the collar 48 engages the pin 52 and moves the slide 38 to the right to engage the brake. When the rod 46 is released, the slide 38 is locked in position by the roller 60.

The left hand end of the rod 46 is located between the slide 38 and the adjacent side wall of the casing 40 in position to engage the roller 60. In releasing the brake, the rod 46 is moved longitudinally to the left to disengage the roller from locking position. After the release of the locking mechanism the movement of the rod 46 preferably is continued until the slide 38 is moved into its limiting brake release position. During this movement of the rod the roller 60 is moved by the engagement of the end of the rod therewith and the slide may be moved through the spring 64. If the resistance to the movement of the slide is sufficient the shoulder 50 may be engaged with the pin 52 and the slide then moved positively by the rod.

In order to prevent the rod 46 from being moved accidentally with relation to the slide 38 into position to unlock the roller 60, a pawl or dog 66 is mounted in the rod 46 for movement transversely of the rod and is arranged to engage a tooth 68 formed on the slide. The dog 66 is normally held in its outermost position with relation to the rod by means of a coiled spring 70, its outward movement being limited by a pin 71. As the rod 46 is moved to the right to engage the brake, the dog 66 yields as it engages the tooth 68 and then passes said tooth. The rod then cannot be moved back to the left to unlock the brake while the dog 66 is in engaging position with relation to the tooth 68.

To enable the dog 66 to be released from holding or engaging position with relation to the tooth 68 so that the rod may be moved longitudinally to unlock the brake, said rod is mounted for rotary movement in the bearing in the end wall of the casing 40 and in the bearing blocks 54. The rod is acted upon by a coiled spring 72 mounted in suitable recesses in the bearing blocks 54, and arranged to engage a plate 74 mounted in the rod 46 to hold the rod normally substantially in the angular position shown in Figs. 6, 7, 9 and 10. When the rod is in this angular position the rod is held from brake releasing movement.

In releasing the dog 66 from engaging position with relation to the tooth 68, the handle 47 is grasped by the driver and the rod 46 is rotated to turn the tooth 68 into a position such as that shown in dot-and-dash lines in Figs. 10 and 11. The rod then may be moved longitudinally to the left, Figs. 6 and 7, to disengage the roller 60 from locking position.

Fig. 11 shows the position in which the casing 40 is preferably mounted with relation to the adjacent side wall of a vehicle indicated generally at 76 to prevent the rod 46 from being accidentally rotated to release the dog 66 from holding position with relation to the tooth 68. As shown in this figure, the casing is mounted sufficiently close to the side wall of the vehicle to prevent the knee or leg of the driver or other person within the vehicle from being inserted between the arm 47 and the adjacent side wall of the vehicle.

In the construction shown in Figs. 1 to 5 inclusive the engagement of the tooth 34 on the hand lever with one of the teeth 32 will not only hold the hand lever from unlocking movement but also, in the event that the roller 24 allows the lever 2 to slip, the said engagement will hold the hand lever and the lever 2 from movement far enough to release the brake. This constitutes another safety feature of the said construction.

In both the above constructions, the brake may be unlocked by a relatively simple easily executed movement of the manually operable member. This member is operated to unlock the brake with the exercise of very little effort on the part of the driver regardless of the force with which the brake is engaged. The said member is securely held from unlocking movement by mechanism which enables the same to be quickly and easily released.

It will be evident that in the embodiment illustrated in Figs. 1 to 5 the hand lever 14 and the member 2 constitute relatively movable members which are operable substantially concurrently for operating a brake. The segments 20 and 30 function as members which are substantially fixed relative to the direction of movement of the hand lever 14 and the member 2. It will also be seen that the element or roller 24 of Fig. 3 cooperates substantially in the position shown for holding the member 2 from movement to the left as viewed in Fig. 3, or in the direction in which the opposed surfaces of the member 20 and the recess 22 diverge. The hand lever 14 constitutes a means which is engageable with the roller 14 for transmitting motion to this roller to dislodge the latter from its locking position. The spur tooth 34 and the teeth 32, of Fig. 4, provide cooperating and interengageable and relatively movable abutments which serve to render the motion transmitting means here represented by the hand lever 14 ineffective for transmitting motion to dislodge the roller 24.

Similarly in the embodiment illustrated in the Figs. 6 to 11, the members 38 and 46 constitute relatively movable members which are operable substantially concurrently for operating a brake, and the casing 40 provides a third member which is substantially fixed relative to the direction of movement of the relatively movable members 38 and 46. The surface 62 of the member 38 and the opposed interior surface of the casing 40 provide opposed converging surfaces with which the element or roller 60 cooperates for locking the member 38 from the desired position. The pawl or dog 66 and the tooth 68 constitute relatively movable cooperating abutments which in this form are carried by the relatively movable members 46 and 38 as distinguished from the embodiment illustrated in Figs. 1 to 5, wherein the relatively movable abutments are carried by the relatively movable hand lever 14 and by the substantially fixed member or segment 30. In both of the illustrated embodiments the cooperating abutments are effective on movement of one of the relatively movable members, as of the hand lever 14, for opposing movement of such hand lever in the opposite direction.

It is to be understood that the invention is not limited to the particular construction and arrangement of parts of the illustrated embodiment of the invention but that the construction shown and described is merely illustrative of the invention and that the invention may be embodied in other forms within the scope of the claims.

Having explained the nature and objects of the invention and having specifically described a construction embodying the invention in its preferred form, what is claimed is:

1. A brake mechanism comprising a brake lever, a hand lever pivoted on the brake lever for actuating the same, a roller for locking the brake lever in braking position, said roller being releasable by pivotal movement of the hand lever and positive retainer means for obstructing an unlocking movement of said lever.

2. A brake mechanism comprising a brake lever, a hand lever pivoted to the brake lever, a roller for locking the brake lever in braking position, said roller being thrown out of operation by pivotal movement of the hand lever, and means releasable by lateral movement of the hand lever for holding the hand lever from unlocking movement.

3. A brake mechanism comprising a brake, a member movable in opposite directions to apply and release the brake, a roller for locking said member in brake applying position, a second member movable in one direction to actuate the first member to apply the brake and movable in the opposite direction with relation to the first member to release the roller from locking position, and releasable means for unyieldingly holding the latter member against said roller releasing movement.

4. The combination of relatively movable levers operable substantially concurrently for operating a brake, a member having a substantially fixed position relative to the direction of movement of said relatively movable levers, one of said levers and said member having opposed surfaces converging approximately in one direction of motion of said levers, an element disposed between said opposed surfaces and adapted when in one position relative to said opposed surfaces to coact with the latter for holding said one of said levers from motion approximately in the direction in which said surfaces diverge, means for transmitting motion to said element to dislodge the latter from said one position to release said one of said levers for motion approximately in the direction in which said surfaces diverge, and means associated with said transmitting means for selectively locking the latter against motion transmitting movement.

5. The combination of relatively movable members operable substantially concurrently for operating a brake, a third member having a substantially fixed position relative to the direction of movement of said relatively movable members, one of said relatively movable members and said third member having opposed surfaces converging approximately in one direction of motion of said relatively movable members, an element disposed between said opposed surfaces and adapted when in one position relative to said opposed surfaces to coact with the latter for holding said one of said relatively movable members from motion approximately in the direction in which said surfaces diverge, movable means engageable with said element for dislodging the latter from said one position to release said one of said relatively movable members for motion approximately in the direction in which said surfaces diverge, and releasable means for unyieldingly rendering said movable means ineffective to dislodge such element from said position holding such members from relative movement.

6. The combination of relatively movable members operable substantially concurrently for operating a brake, a third member having a substantially fixed position relative to the direction of movement of said relatively movable members, one of said relatively movable members and said third member having opposed surfaces converging approximately in one direction of motion of said relatively movable members, an element disposed between said opposed surfaces and adapted when in one position relative to said opposed surfaces to coact with the latter for holding said one of said relatively movable members from motion approximately in the direction in which said surfaces diverge, the other of said relatively movable members being engageable with said element for dislodging the latter from said one position to release said one of said relatively movable members for movement approximately in the direction in which said surfaces diverge, and releasable means for unyieldingly rendering said other of said relatively movable members ineffective for this purpose.

7. The combination of relatively movable members operable substantially concurrently for operating a brake, a third member having a substantially fixed position relative to the direction of movement of said relatively movable members, one of said relatively movable members and said third member having opposed surfaces converging approximately in one direction of motion of said relatively movable members, an element disposed between said opposed surfaces and adapted when in one position relative to said opposed surfaces to coact with the latter for holding said one of said relatively movable members from motion approximately in the direction in which said surfaces diverge, means for transmitting motion through said element to said one of said relatively movable members for dislodging said element from said one position thereof to release said one of said relatively movable members and to move the latter approximately in the direction in which said surfaces diverge, and releasable means for unyieldingly rendering said motion transmitting means ineffective.

8. The combination of relatively movable members operable substantially concurrently for operating a brake, a third member having a substantially fixed position relative to the direction of movement of said relatively movable members, one of said relatively movable members and said third member having opposed surfaces converging approximately in one direction of motion of said relatively movable members, an element disposed between said opposed surfaces and adapted when in one position relative to said opposed surfaces to coact with the latter for holding said one of said relatively movable members from motion approximately in the direction in which said surfaces diverge, the other of said relatively movable members being operable to directly engage said element to dislodge the latter from said one position and for imparting motion to said one of said relatively movable members approximately in the direction in which said surfaces diverge, and positive retainer means for rendering said other of said relatively movable members ineffective for these purposes.

9. The combination of relatively movable levers operable substantially concurrently for operating a brake, a member having a substantially fixed position relative to the direction of movement of said levers, one of said levers and said member having opposed surfaces converging approximately in one direction of motion of said relatively movable levers, an element disposed between said opposed surfaces and adapted when in one position relative to said opposed surfaces to coact with the latter for holding said one of said levers from motion approximately in the direction in which said surfaces diverge, means for transmitting motion to said element to dislodge the latter from said one position to release said engaged lever, and relatively movable abutment means associated with said transmitting means for selectively locking the latter against motion transmitting movement.

10. The combination of relatively movable members operable substantially concurrently for operating a brake, a third member having a substantially fixed position relative to the direction of movement of said relatively movable members, one of said relatively movable members and said third member having opposed surfaces converging approximately in one direction of motion of said relatively movable members, an element disposed between said opposed surfaces and adapted when in one position relative to said opposed surfaces to coact with the latter for holding said one of said relatively movable members from motion approximately in the direction in which said surfaces diverge, the other of said relatively movable members being directly engageable with said element for dislodging the latter from said one position to release said one of said relatively movable members, and cooperable abutments releasably engageable on movement of the other of said relatively movable members approximately in the direction in which said surfaces converge for obstructing movement of the latter member in the opposite direction.

11. The combination of relatively movable members operable substantially concurrently for operating a brake, a third member having a substantially fixed position relative to the direction of movement of said relatively movable members, one of said relatively movable members and said third member having opposed surfaces converging approximately in one direction of motion of said relatively movable members, an element disposed between said opposed surfaces and adapted when in one position relative to said opposed surfaces to coact with the latter for holding said one of said relatively movable members from motion approximately in the direction in which said surfaces diverge, the other of said relatively movable members being engageable with said element for dislodging the latter from said one position to release said one of said relatively movable members, and cooperable abutments carried by said other of said relatively movable members and said third member, these abutments being brought into a releasable engagement unyielding in one direction on movement of said other of said relatively movable members approximately in the direction in which said surfaces converge for opposing movement of the latter member in the opposite direction.

12. The combination of relatively movable members operable substantially concurrently for operating a brake, a third member having a substantially fixed position relative to the direction of movement of said relatively movable members, one of said relatively movable members and said third member having opposed surfaces converging approximately in one direction of motion of said relatively movable members, an element disposed between said opposed surfaces and adapted when in one position relative to said opposed surfaces to coact with the latter for holding said one of said relatively movable members from motion approximately in the direction in which said surfaces diverge, the other of said relatively movable members being engageable with said element for dislodging the latter from said one position to release said one of said relatively movable members, cooperable abutments effective on movement of said other of said relatively movable members approximately in the direction in which said surfaces converge for opposing movement of the latter member in the opposite direction, one of these abutments being carried by said other of said relatively movable members and the other of these abutments being carried by said third member.

13. The combination of relatively movable members operable substantially concurrently for operating a brake, a third member having a substantially fixed position relative to the direction of movement of said relatively movable members, one of said relatively movable members and said third member having opposed surfaces converging approximately in one direction of motion of said relatively movable members, an element disposed between said opposed surfaces and adapted when in one position relative to said opposed surfaces to coact with the latter for holding said one of said relatively movable members from motion approximately in the direction in which said surfaces diverge, the other of said relatively movable members being engageable with said element for dislodging the latter from said one position to release said one of said relatively movable members, cooperable abutments carried by said one and said other of said relatively movable members, these abutments being so constructed and arranged as to be brought into engagement on movement of said other of said relatively movable members approximately in the direction in which said surfaces converge and to obstruct movement of the latter member in the opposite direction.

14. The combination of relatively movable levers operable substantially concurrently for operating a brake, a member having a substantially fixed position relative to the direction of movement of said levers, friction roller means cooperating with said member and one of said levers for holding the latter from movement in one direction, means for transmitting motion to said friction roller means to release the lever engaged thereby, and means associated with said transmitting means for locking the latter against roller releasing movement.

15. The combination of relatively movable levers operable substantially concurrently for operating a brake, a member having a substantially fixed position relative to the direction of movement of said relatively movable levers, friction roller means cooperating with said member and one of said levers for holding the latter from movement in one direction, means for transmitting motion to said friction roller means to release said engaged lever, and releasable means cooperating with said levers for locking said motion transmitting means against roller releasing movement.

16. The combination of relatively movable members operable substantially concurrently for operating a brake, a third member having a substantially fixed position relative to the direction of motion of said relatively movable members, friction roller means cooperating with said third member and one of said relatively movable members for holding the latter from movement in one direction, means for transmitting motion to said friction roller means to release said one of said relatively movable members, cooperable abutments brought into engagement by movement of the other of said relatively movable members in a direction opposite to said one direction, said abutments releasably obstructing the return of said motion transmitting means, one of said abutments being carried by said other of said relatively movable members.

17. The combination of relatively movable members operable substantially concurrently for operating a brake, a third member having a substantially fixed position relative to the direction of motion of said relatively movable members, friction roller means cooperating with said third member and one of said relatively movable members for holding the latter from movement in one direction, means for transmitting motion to said friction roller means to release said one of said relatively movable members, cooperable abutments effective on movement of the other of said relatively movable members in a direction opposite to said one direction for opposing said motion transmitting means, said abutments being carried by said third member and by said other of said relatively movable members.

18. The combination of relatively movable levers operable substantially concurrently for operating a brake, a member having a substantially fixed position relative to the direction of motion of said levers, friction roller means cooperating with said member and one of said levers for holding the latter from movement in one direction, means for transmitting motion to said friction roller means to release said engaged lever, cooperable abutments for blocking movement of the other of said levers in a direction opposite to said one direction, said abutments being carried by one of said levers and said member.

19. An actuating mechanism comprising a fixed supporting member, means movable relative to said member in one direction, friction locking means disposed between said member and said movable means for preventing movement of said means in a reverse direction to that previously mentioned, a manually operable control member pivotally mounted on said movable means adapted to move said movable means in said first mentioned direction and to engage and release said friction means when moved in said reverse direction, and positively releasable means for locking said manual member against movement in said reverse direction.

20. In combination with a brake mechanism, a fixed member, means movable relative to said member for controlling said brake mechanism, means disposed between said member and said movable means for automatically locking them against a relative movement releasing the brake mechanism, a manually operable control member mounted on said movable means in a relation to actuate said movable means when moved in one direction and releasing said automatic means when moved in an opposite direction, and releasable means for positively locking said manual member against movement in said opposite direction.

21. In combination with actuator means for brakes, control means comprising a fixed supporting member, means mounted on and movable relative to said member for actuating said brake mechanism, automatic means disposed between said member and said movable means for locking them against a relative movement releasing the brake mechanism, a manually controlled member mounted on said movable means rotatable about an axis fixed relative to said movable means and initiating brake engagement when moved in one direction and releasing said automatic means when moved in an opposite direction, and releasable means for positively locking said manual member against movement in said opposite direction.

22. The combination with a brake mechanism, of control mechanism comprising a fixed supporting member, means movably mounted relative to said member and connected to actuate said brake mechanism, automatic means disposed between said member and said movable means for locking them against a relative movement releasing the brake mechanism, a manually operable control member movably mounted on said movable means about an axis of rotation fixed relative to said movable means for initiating brake engagement when moved in one direction, means integral with said manual means for directly engaging said automatic means to release said automatic means when said manual means is moved in an opposite direction, and releasable means for unyieldingly locking said manual member against movement in a brake mechanism releasing direction.

23. A brake mechanism comprising a brake, a member movable in opposite directions to apply and release the brake, a roller for locking said member in brake applying position, a second member movable in one direction to actuate the first member to apply the brake and movable in the opposite direction with relation to the first member to release the roller from locking position, and releasable means engaging the second member for securing the second member against said roller releasing movement, said second member being laterally movable in a third direction for effecting release of said releasable means.

MILTON TIBBETTS.